United States Patent
Boland et al.

(10) Patent No.: US 7,613,447 B2
(45) Date of Patent: Nov. 3, 2009

(54) SYSTEM FOR IDENTIFYING THE LOCATION OF SELECTED MOBILE STATIONS

(75) Inventors: Richard Robert Boland, La Grange, IL (US); Mark Alan McCormick, Naperville, IL (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 500 days.

(21) Appl. No.: 11/385,385

(22) Filed: Mar. 21, 2006

(65) Prior Publication Data

US 2007/0224968 A1    Sep. 27, 2007

(51) Int. Cl.
   *H04M 1/66* (2006.01)
(52) U.S. Cl. ............... 455/411; 455/433; 455/456.1
(58) Field of Classification Search ................ 455/411, 455/433, 456.1–3, 404.2, 403; 342/357.06–9, 342/357.12
   See application file for complete search history.

(56) References Cited

U.S. PATENT DOCUMENTS

| | | | |
|---|---|---|---|
| 6,385,458 B1 * | 5/2002 | Papadimitriou et al. | 455/456.2 |
| 7,260,378 B2 * | 8/2007 | Holland et al. | 455/404.2 |
| 2003/0216143 A1 * | 11/2003 | Roese et al. | 455/456.1 |
| 2005/0148344 A1 * | 7/2005 | Fan et al. | 455/456.3 |
| 2007/0152877 A1 * | 7/2007 | Madhaven et al. | 342/357.02 |

\* cited by examiner

Primary Examiner—CongVan Tran
(74) Attorney, Agent, or Firm—Patton Boggs, LLP

(57) ABSTRACT

The present system for identifying the location of selected mobile stations includes two components: a first component that authenticates an authorized party who logs into the Mobile Switching Center, and a second component that is responsive to the entry of a system activation command by the authorized party for locating selected mobile stations and providing mobile station location information to the authorized party. The present system for identifying the location of selected mobile stations enables a service provider to track a mobile station through the use of Autonomous Registrations or the polling of a selected mobile station or a set of mobile stations. Once communication with the selected mobile station is established, the GPS coordinates of the selected mobile station are retrieved and provided to an authorized party to enable them to locate the subscriber and their mobile station.

12 Claims, 2 Drawing Sheets

SYSTEM FOR IDENTIFYING THE LOCATION OF SELECTED MOBILE STATIONS

FIELD OF THE INVENTION

This invention relates to cellular communication networks and, in particular, to a mobile station location system to identify a present location of customers via their mobile stations in response to a query originated by an authorized agent.

BACKGROUND OF THE INVENTION

It is a problem that when natural disasters or terrorist attacks occur, cellular subscribers may have to evacuate their homes and it is difficult to locate these individuals. It is also frequently imperative to locate a mobile station that is operational in a cellular communication network when the subscriber is unable to respond to an incoming call to their mobile station, such as when the subscriber is unconscious or a hostage. In all of these situations, an authorized agent, such as law enforcement or disaster relief, has an interest in determining the present location of the subscriber; and it is advantageous to locate the subscriber by means of tracking their mobile station. However, there is presently no system available that can perform this task.

Therefore, there is presently a lack of an effective method to identify a present location of customers in a cellular communication network in response to a query originated by an authorized agent.

BRIEF SUMMARY OF THE INVENTION

The present system for identifying the location of selected mobile stations includes two components: a first component that authenticates an authorized party who logs into the Mobile Switching Center, and a second component that is responsive to the entry of a system activation command by the authorized party for locating selected mobile stations and providing mobile station location information to the authorized party.

The present system for identifying the location of selected mobile stations enables a service provider to track a mobile station through the use of Autonomous Registrations or the paging of a selected mobile station or a set of mobile stations. Once communication with the selected mobile station is established, the GPS coordinates of the selected mobile station are retrieved and provided to an authorized party to enable them to locate the subscriber and their mobile station. This system for identifying the location of selected mobile stations can locate and track a single mobile station or a large group of mobile stations, with the system for identifying the location of selected mobile stations being activated from a single point on the network.

Once the system for identifying the location of selected mobile stations is activated, there are a number of processes that can be used to locate the selected mobile station. The selected mobile station can be polled, the interval between Autonomous Registrations originated by the mobile station can be reduced to obtain more frequent location data, and/or the Route Optimization Protocol (ROP) can be used during the execution of the mobile station search process. In addition, the system for identifying the location of selected mobile stations not only can gather the requested mobile station location information, but also can report the accumulated information while a call is activated by the mobile station. The collected information may include handoff information as well as an indication of whether the handoff is a hard handoff or a soft handoff and any GPS information that is obtained during the call. Selected mobile stations or classes of subscribers may be distinguished by the use of data stored in the Home Location Register associated with the selected mobile stations indicative of exclusion from operation of the present system. This Home Location Register (HLR) data can be forwarded to Visitor Location Registers (VLR) in Serving Mobile Switching Centers. The mobile stations must be powered up and have sufficient signal strength for connectivity to the Serving Mobile Switching Center for the system for identifying the location of selected mobile stations to function.

DETAILED DESCRIPTION OF THE INVENTION

Figure 1:
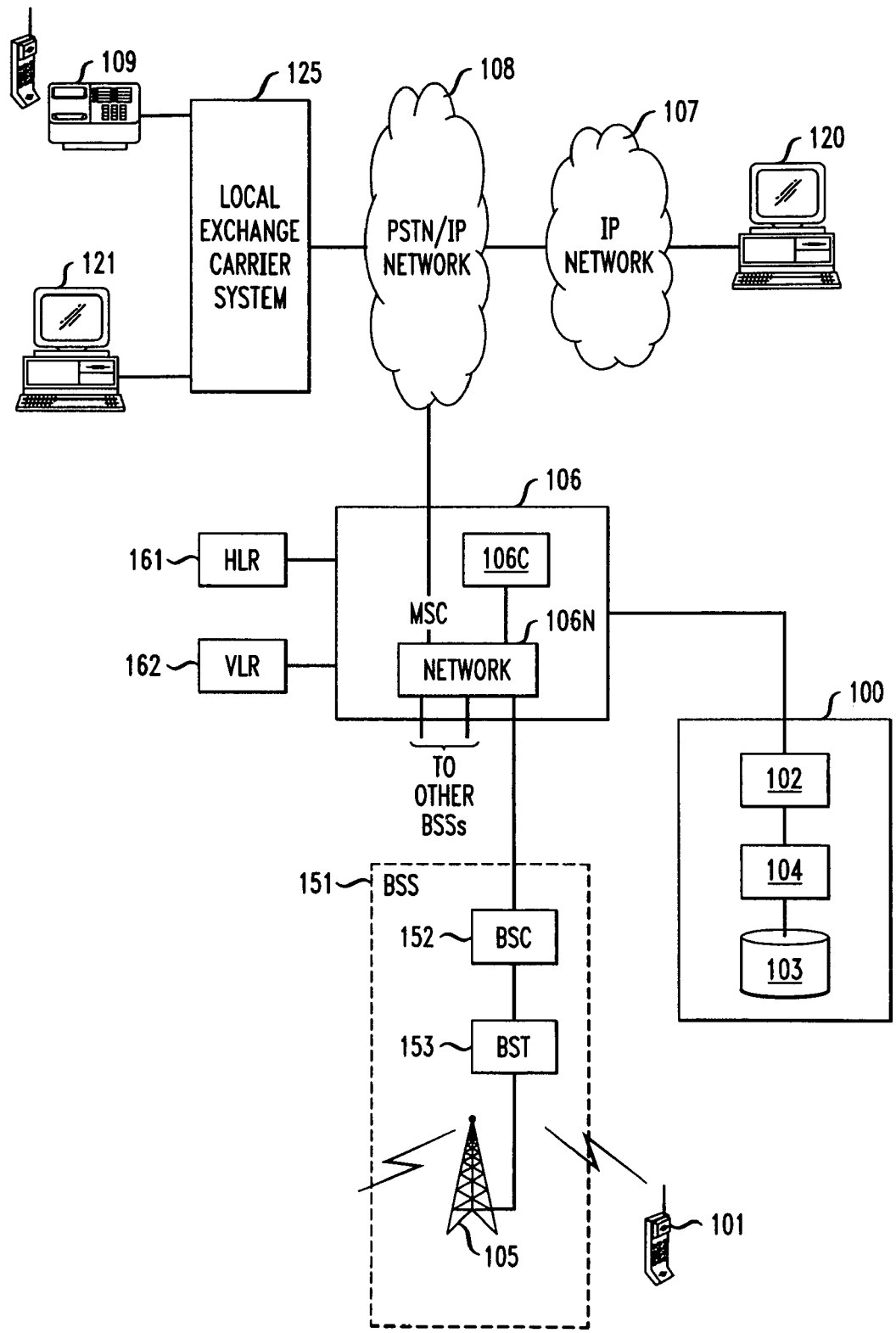
FIG. 1 illustrates the architecture of the telephone communication network and the presence of the present system for identifying the location of selected mobile stations.

FIG. 1 illustrates the architecture of a typical telephone communication network and the present system for identifying the location of selected mobile stations. In the present description, the major entities of the cellular communication network providing wireless telephone services to the mobile station 101 are the Base Station Subsystem 151 that is associated with the Mobile Switching Center 106. In a typical cellular communications network, there is a plurality of Mobile Switching Centers 106 and a plurality of Base Station Subsystems 151, but for the sake of simplicity only a single Mobile Switching Center and a single Base Station Subsystem are shown.

The typical implementation of an existing Mobile Switching Center 106 comprises a Mobile Switching Center Controller 106C, which executes call processing routines associated with the Mobile Switching Center 106. A switching network 106N provides the telephone connectivity between Base Station Subsystem 151, the Public Switched Telephone Network 108, and other Base Station Subsystems (not shown) served by the Mobile Switching Center 106. Base Station Subsystem 151 communicates with mobile station 101 using Radio Frequency (RF) channels which convey both command messages as well as digital data, which may represent voice signals being articulated at the mobile station 101 and the far-end party.

The voice communications between mobile station 101 and other subscriber stations, such as land-line based subscriber station 109, is effected by routing the communications received from the mobile station 101 via switching network 106N and trunks to the Public Switched Telephone Network (PSTN) 108 where the communications are routed to a Local Exchange Carrier 125 that serves land-line based subscriber station 109. There are numerous Mobile Switching Centers 106 that are connected to the Public Switched Telephone Network (PSTN) 108 thereby to enable subscribers at both land-line based subscriber stations and wireless subscriber devices to communicate between selected stations thereof. This architecture represents the present architecture of the wireless and wire-line communication networks.

The present system for identifying the location of selected mobile stations 100 is shown connected to the Mobile Switching Center 106, although it may be an integral part of the Mobile Switching Center 106 in the form of additional processes that execute on the existing equipment. The present system for identifying the location of selected mobile stations 100 includes a user interface 102 for providing an authorized party with an access point, a memory 103, and a processor 104 (which could be part of Mobile Switching Center Controller 106C).

There are numerous processes that execute on the typical mobile station 101, and a number of these can be used to determine the present location of a mobile station and, by inference, the subscriber. Where the mobile station is equipped with a GPS receiver, the precise coordinates of the mobile station 101 can be retrieved from the mobile station 101 in the implementation of the process described below.

Paging Process

While a mobile station 101 is served by a particular Mobile Switching Center 106 in the cellular communication network for most of the time is in the idle state. The mobile station 101 periodically turns on its receiver briefly to see if it has been paged, which means to find out if there is an incoming call (mobile termination call) or a message. This happens on what is known as a slot cycle, and the base station subsystem 151 controls the period of the slot cycle. The advantage of a longer slot cycle is that the mobile station 101 spends a lower percentage of the time with its receiver on; thus, the battery lasts longer. It also means there is more capacity on the paging channel. The advantage of a shorter slot cycle is that the mobile station 101 gets more chances to receive the page and receives the page sooner. The purpose of the slot cycle is to permit the mobile station 101 to keep the receiver turned off most of the time to extend battery life. When the mobile station 101 first registers with a base station subsystem 151, the base station subsystem 151 and mobile station 101 determine which paging channel the mobile station 101 will use (if there is more than one) and what phase of the slot cycle that mobile station 101 will use. Thereafter, the mobile station 101 wakes periodically, turns its receiver on briefly to see if it has an incoming call or if there is other traffic from the cell it must respond to, and if there is nothing then it shuts the receiver down again and waits until the next slot time.

The Base Station Subsystem 151 can transmit a page to the mobile station 101 along with a message to have the mobile station 101 return the last determined GPS data from the mobile station 101. In cases where the system for identifying the location of selected mobile stations 100 is requested to track the movement of the selected mobile station 101, a shorter slot cycle can be set to enable the mobile station 101 to more rapidly respond to subsequent pages.

Registration Process

The mobile performs Registration procedures to keep informing the base station subsystem of its current location.

The CDMA system supports nine different forms of registration:

1. Power-up registration. The mobile station registers when it powers on or switches from using the analog system.
2. Power-down registration. The mobile station registers when it powers off if previously registered in the current serving system.
3. Timer-based registration. The mobile station registers when a timer expires.
4. Distance-based registration. The mobile station registers when the distance between the current base station subsystem and the base station subsystem in which it last registered exceeds a threshold.
5. Zone-based registration. The mobile station registers when it enters a new zone.
6. Parameter-change registration. The mobile station registers when certain of its stored parameters change or when it enters a new system.
7. Ordered registration. The mobile station registers when the base station subsystem requests it.
8. Implicit registration. When a mobile station successfully sends an Origination Message or Page Response Message, the base station subsystem can infer the mobile station's location.
9. Traffic Channel registration. For Registration in active mode.

The first five forms of registration, as a group, are called autonomous registration and are initiated by the mobile station 101 without requiring a request from the base station subsystem 151.

Route Optimization Protocol

In cellular networks, it is not efficient that all packets destined to a Mobile Station must be routed through the Mobile Station's home agent. This can be achieved by using the triangle routing scheme. To solve this triangle problem, Route Optimization Protocol extends the concept of the basic MIP in order to achieve optimization of routing from a corresponding node to a Mobile Station through eliminating the Home Agent. All packets destined to the Mobile Station are routed directly to the current foreign agent of the Mobile Station. The Home Agent transfers the Registration message to the sender, i.e. the corresponding node, and the foreign agent updates the Binding Cache according to the received Registration message.

Figure 2:
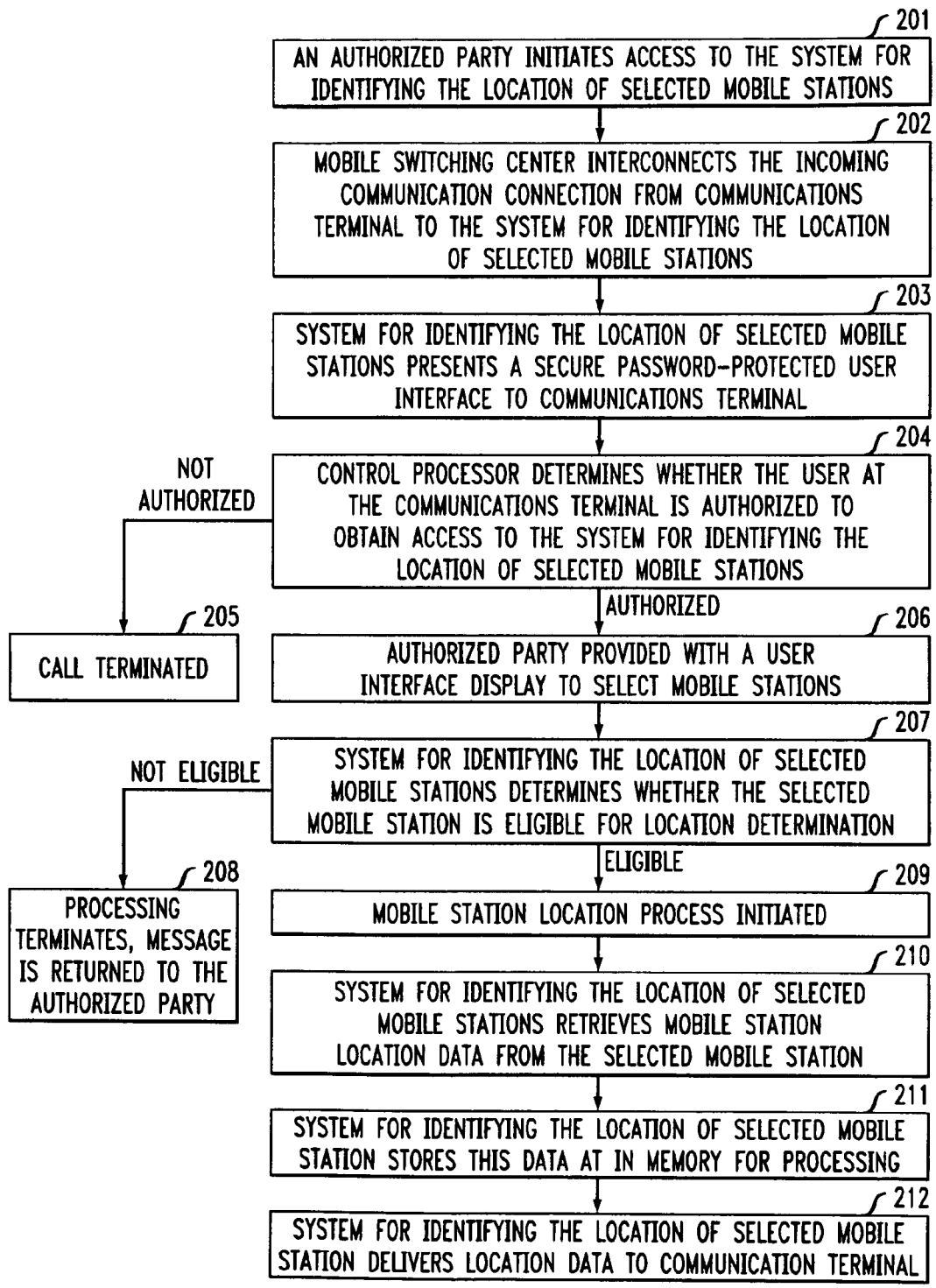
FIG. 2 illustrates, in flow diagram form, the operation of the present system for identifying the location of selected mobile stations.

Operation of the System for Identifying the Location of Selected Mobile Stations FIG. 2 illustrates, in flow diagram form, the operation of the present system for identifying the location of selected mobile stations. The system for identifying the location of selected mobile stations 100 consists of two components: a first component that authenticates an authorized party who logs in via the Mobile Switching Center 106, and a second component that is responsive to the entry of a system activation command by the authorized party for locating selected mobile stations and providing mobile station location information to the authorized party.

In operation, an authorized party initiates access to the system for identifying the location of selected mobile stations 100 at step 201 by initiating a communication session at their communications terminal 120 and identifying the system for identifying the location of selected mobile stations 100 as the destination system. The communications terminal 120 is typically connected via an IP network 107, through the Public Switched Telephone Network 108 to the Mobile Switching Center 106 that serves the selected mobile station 101 that is to be located. At step 202, the Mobile Switching Center 106 interconnects the incoming communication connection from communications terminal 120 to the system for identifying the location of selected mobile stations 100; and at step 203, the system for identifying the location of selected mobile stations 100 presents an access port to communications terminal 120 via a secure password-protected user interface 102. User interface 102 of the system for identifying the location of selected mobile stations 100 executes a typical password-protected process to ensure that the authorized party at communications terminal 120 is authorized to access the mobile station location services noted herein. At step 204, control processor 104 determines whether the user at the user interface 102 is authorized to obtain access to the system for identifying the location of selected mobile stations 100. If not, the communications connection to communications terminal 120 is terminated at step 205. If access is enabled, at step 206, the authorized party at communications terminal 120 is provided with a user interface display (not shown), which enables them to input the identification of one or more mobile stations whose present location is desired. The Home Location Register (and Visitor Location Register) of the Mobile Switching Center 106 maintains data indicative of the mobile stations served by the Mobile Switching Center 106, and this data includes an indication of whether a selected mobile station is exempt from the operation of the system for identifying the location of selected mobile stations 100. At step 207, the system for identifying the location of selected mobile stations 100 determines whether the selected mobile station 101 is eligible for location determination. If not, processing terminates and a message is returned to the authorized party at communications terminal 120 at step 208. If the process is authorized, then processing advances as described below.

Since the process executed by the system for identifying the location of selected mobile stations 100 is location determination, a communication connection to the subscriber at mobile station 101 is not desired and the query to mobile station 101 is accomplished in an unobtrusive manner where the subscriber is unaware of the query process that is being executed. In response to the receipt of mobile station identification data, the system for identifying the location of selected mobile stations 100 at step 209 initiates a mobile station location process, such as one of the above-noted paging, registration, or ROP processes to obtain GPS location data from the selected mobile station 101. Therefore, the system for identifying the location of selected mobile stations 100 simply retrieves mobile station location data at step 210 from the selected mobile station 101 and stores this data at step 211 in memory for processing and delivery to communication terminal 120 at step 212.

SUMMARY

The present system for identifying the location of selected mobile stations enables a service provider to track a mobile station through the use of Autonomous Registrations or the polling of a selected mobile station or a set of mobile stations. Once communication with the selected mobile station is established, the GPS coordinates of the selected mobile station are retrieved and provided to an authorized party to enable them to locate the subscriber and their mobile station.

What is claimed as new and desired to be protected by Letters Patent of the United States is:

1. A system for identifying the location of selected mobile stations connected to a cellular communication network, comprising:
    authentication means for determining authorization of an accessing party to request mobile station location determination, comprising:
        password access means for providing password protection of said system for identifying the location of selected mobile stations, and
        mobile station exemption determining means, responsive to identification of a selected mobile station by said accessing party, for determining whether said selected mobile station is exempt from location determination;
    mobile station query means, responsive to identification of a selected mobile station by said authorized accessing party, for determining a serving cell site of said selected mobile station via execution of a mobile station registration process in said cellular communication network; and
    mobile station location means for determining a present geographic location of said selected mobile station by the exchange of location request messages and Global Positioning Satellite (GPS) data on the paging channel which serves said selected mobile station and absent identification of the executing location tracking process to a user of said selected mobile station.

2. The system for identifying the location of selected mobile stations of claim 1 wherein said mobile station query means comprises:
    mobile station paging means for transmitting a message to said selected mobile station to activate said mobile station to return the last determined GPS data from the mobile station.

3. The system for identifying the location of selected mobile stations of claim 1 wherein said mobile station query means comprises:
    mobile station registration means, responsive to identification of a selected mobile station by said accessing party, for activating the base station subsystem to request said selected mobile station to register.

4. The system for identifying the location of selected mobile stations of claim 1 wherein said mobile station query means comprises:
    mobile station registration means, responsive to identification of a selected mobile station by said accessing party, for activating the base station subsystem to store location information when said selected mobile station executes an autonomous registration process.

5. The system for identifying the location of selected mobile stations of claim 1 wherein said mobile station query means comprises:
    GPS means for retrieving GPS data, indicative of a present geographic location of said selected mobile station, from said selected mobile station.

6. The system for identifying the location of selected mobile stations of claim 1 further comprising:
    location response means for delivering geographic location data relating to said selected mobile station to said accessing party.

7. The method for identifying the location of selected mobile stations connected to a cellular communication network, comprising:
    determining authorization of an accessing party to request mobile station location determination, comprising:
        providing password protection of said system for identifying the location of selected mobile stations, and
        determining, in response to identification of a selected mobile station by said accessing party, whether said selected mobile station is exempt from location determination;
    determining, in response to identification of a selected mobile station by said authorized accessing party, for determining a serving cell site of said selected mobile station via execution of a mobile station registration process in said cellular communication network; and
    determining a present geographic location of said selected mobile station by the exchange of location request messages and Global Positioning Satellite (GPS) data on the paging channel which serves said selected mobile station and absent identification of the executing location tracking process to a user of said selected mobile station.

8. The method for identifying the location of selected mobile stations of claim 7 wherein said step of determining a present geographic location comprises:

transmitting a message to said selected mobile station to activate said mobile station to return the last determined GPS data from the mobile station.

9. The method for identifying the location of selected mobile stations of claim 7 wherein said step of determining a present geographic location comprises:

activating, in response to identification of a selected mobile station by said accessing party, the base station subsystem to request said selected mobile station to register.

10. The system for identifying the location of selected mobile stations of claim 7 wherein said step of determining a present geographic location comprises:

activating, in response to identification of a selected mobile station by said accessing party, the base station subsystem to storing location information when said selected mobile station executes an autonomous registration process.

11. The system for identifying the location of selected mobile stations of claim 7 wherein said step of determining a present geographic location comprises:

retrieving GPS data, indicative of a present geographic location of said selected mobile station, from said selected mobile station.

12. The system for identifying the location of selected mobile stations of claim 7 further comprising:

delivering geographic location data relating to said selected mobile station to said accessing party.

* * * * *

UNITED STATES PATENT AND TRADEMARK OFFICE
CERTIFICATE OF CORRECTION

| | | |
|---|---|---|
| PATENT NO. | : 7,613,447 B2 | Page 1 of 1 |
| APPLICATION NO. | : 11/385385 | |
| DATED | : November 3, 2009 | |
| INVENTOR(S) | : Boland et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 727 days.

Signed and Sealed this

Nineteenth Day of October, 2010

David J. Kappos
*Director of the United States Patent and Trademark Office*